Patented Sept. 1, 1942

2,294,442

UNITED STATES PATENT OFFICE 2,294,442

METHOD OF FORMING AMINO COMPOUNDS

Frederick C. Bersworth, Verona, N. J., assignor to The Martin Dennis Company, Newark, N. J., a corporation of New Jersey No Drawing. Application July 13, 1939,
Serial No. 284,216

7 Claims. (Cl. 260—404)

This invention relates to chemistry and more particularly to organic chemistry and has for its object the provision of a commercially practical method of forming amino compounds from those organic compounds heretofore known in the art as being capable of being hydrogenated by the direct substitution therein of ammonia.

Another object is to provide a simple and economically practical method of producing amino compounds by direct substitution of ammonia into organic compounds known generally in the art as being capable of being hydrogenated.

Still another object is to provide an improved process of forming amino. Other objects and advantages will be apparent as the invention is more fully hereinafter disclosed.

In accordance with the above objects I have discovered that ammonia is capable of being activated by so-called hydrogenating catalysts and when so activated may be caused to enter directly and bodily into combination with those organic compounds capable of being hydrogenated to form amino compounds therewith without the necessity of going through an extended series of steps as heretofore practiced in the art.

Heretofore in the art, the formation of amino compounds from organic compounds of the class known generally as those capable of being hydrogenated has been exceedingly tedious and has required the practice of a number of different steps. As examples of the organic compounds capable of being hydrogenated may be mentioned the oleic acid, castor oil, castor oil fatty acids, and the anhydrides of castor oil fatty acids, and stearolic acid, as representative members of the hydrogenatable compounds identified. These compounds are all characterized by having at least one group or radical which is unsatisfied as to its hydrogen component.

In accordance with the present invention, these organic compounds are brought into reactive contact with ammonia in the presence of a hydrogenating catalyst at a temperature at which the said catalyst is effective in activating the ammonia. Under these conditions I find that the ammonia is activated and moved bodily into the hydrogenatable organic compound substantially in accordance with the following reaction:

$$A+NH_3+catalyst=A\cdot H\cdot NH_2$$

where A=an organic compound capable of being hydrogenated.

In the presence of an activating catalyst and at the proper temperature, I find that ammonia, instead of being reduced to the $NH_2$ radical as heretofore considered necessary before substitution can be effected, becomes activated in accordance with the following reaction:

$$NH_3+catalyst=H^+\cdot NH_2$$

In the presence of a compound capable of being hydrogenated the $H^+\cdot NH_2$ moves bodily into the compound exactly as would hydrogen if similarly activated and accordingly by direct substitution an amino compound of the hydrogenatable organic compound is obtained.

As one specific embodiment of the practice of the present invention but not as a limitation thereof, I will describe the same as applied in the production as an amino compound by the direct substitution of activated ammonia in a hydrogenatable organic compound, specifically oleic acid $(CH_3\cdot(CH_2)_7\cdot CH = CH\cdot(CH_2)_7\cdot COOH)$. This compound is hydrogenatable to stearic acid $(CH_3\cdot(CH_2)_7\cdot CH_2\cdot CH_2\cdot(CH_2)_7\cdot COOH)$ by saturating the center olefinic linkage (CH=CH) with activated hydrogen.

In accordance with the present invention the center olefinic linkage is saturated with activated ammonia ($NH_3$) in accordance with the following equation:

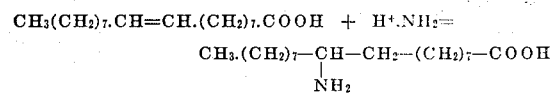

In this reaction the activated ammonia saturates the center olefinic linkage (CH=CH) forming a high molecular weight amphoteric mono-amino acid heretofore not described in the literature, which is a viscous amber colored liquid highly useful in the art as an emulsifying agent, a condensing agent, or as an addition agent in products such as resins, lubricating oils, hard water soaps, foaming agents, and the like where its amphoteric character coupled with its high molecular weight fatty residue is of particular advantage.

In the preparation of this compound I proceed as follows:

A known quantity of oleic acid, thoroughly dehydrated, is dissolved in a non-reactive solvent such as xylene, benzene, etc. sufficient to maintain a continuous liquid phase throughout the amination reaction and is placed in a container closed to the atmosphere. Means such as a mercury leg is provided in the closed container to indicate the pressures within the container and sufficient anhydrous ammonia gas is passed into the liquid to convert the oleic acid first to the ammonium salt or the amide of the acid. This reaction is exothermic in nature and the oleic acid solution is subjected to cooling to avoid loss of solvent.

After the oleic acid has been fully converted to the ammonium salt or amide, a catalyst, preferably platinum or palladium black deposited on glass wool to obtain the necessary large surface area of the catalyst, is placed in the container (preferably immersed in the liquid) and the container is closed to the atmosphere and all or substantially all air or free oxygen is removed by evacuation therefrom.

Anhydrous ammonia then is introduced under pressure into the container, preferably passing through the liquid, until the mercury leg indicates a positive ammonia pressure considerably in excess of atmospheric pressure present in the container and further additions of ammonia are made to the container as the ammonia therein is absorbed by the liquid until a total in excess of about 17 parts of ammonia per mole of oleic acid ammonium salt or amide has been introduced within the container, maintaining at all times a positive pressure of ammonia in the container.

Amination of the olefinic links proceeds in the presence of platinum or palladium black catalyst at approximately room temperatures and at a fairly rapid rate and terminaton or completion of the amination reaction is indicated when upon further addition of ammonia a rising pressure of ammonia is permanently indicated on the mercury leg of the closed container.

The resulting solution is filtered from the catalyst and the solvent employed is distilled off, preferably under vacuum, and the viscous liquid remaining which is the amide of the aminostearic acid produced from the oleic acid by the introduction of the ammonia in the olefinic linkage, in an approximately quantitative yield, is hydrolyzed to the free amino-acid by treatment with an acid as heretofore known in the art, and the amino-acid compound thus obtained is separated from the ammonium salt formed during hydrolysis in accordance with well known prior art practice.

By conducting the same reaction under an ammonia pressure in excess of approximately 150 pounds, using the same catalyst, I have found that I may cause the olefinic linkage to absorb two moles of NH₃ instead of one mole with consequent splitting of the amino acid first obtained into one mole of a primary amine (nonylamine) and one mole of omega amino-acid (omega-octyl-amino acid) in accordance with the following reaction:

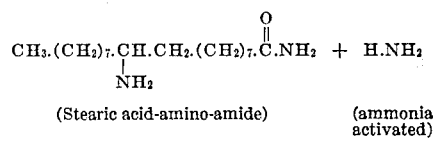

(Stearic acid-amino-amide)　(ammonia activated)

react to form:

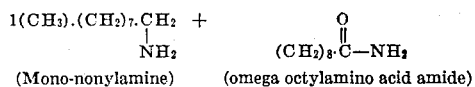

(Mono-nonylamine)　(omega octylamino acid amide)

In this reaction the activated H of the NH₃ enters into the previously aminated CH group of the center olefinic bond to form a CH₂ group thus splitting a nonylamine compound from the amino amide previously formed. The remainder of the amino amide containing the other CH₂ group of the olefinic bond then takes up the NH₂ residue of the activated ammonia and forms therewith the omega octyl amino acid amide. This reaction also is substantially quantitative and proceeds to completion at approximately atmospheric temperatures at a fairly rapid rate.

These two compounds can be recovered from the solution by fractional crystallization of their respective hydrochlorides in accordance with heretofore well known procedure. The omega octyl amino acid hydro-chloride or the free omega acid compound has not heretofore been produced by any synthetic process, sa far as I am aware. This omega octyl amino compound being of high molecular weight and amphoteric in nature and reactions, is of particular utility in a number of different chemical and industrial fields, especially in the manufacture of condensation products or polymerizates, known in the art as linear condensation products used in the production of fibers and also may be hydrogenated to high molecular weight di-amines in accordance with the method described and claimed in my co-pending application Serial No. 260,455, filed March 7, 1939.

Whereas in the above specific embodiment I have described the same in connection with the use of platinum or palladium black catalyst, I am not to be construed as being limited thereto, as I have found that any hydrogenating catalyst may be employed provided the temperature of the liquid be maintained at an activating temperature characteristic of the particular catalyst used. Hence, copper-chromite catalyst being active as a hydrogenating catalyst at temperatures approximating 200° C. is operative to activate ammonia at temperatures from approximately 160° C. to 210° C. having its maximum efficiency at about 185–190° C. Other catalysts behave similarly to copper-chromite in the actuation of ammonia in that the temperature at which maximum efficiency is obtained is slightly lower than that normally found necessary in the activation of hydrogen.

At these higher activating temperatures care must be exercised to maintain a relative small excess of ammonia and low pressures of the same if the first reaction above described is desired. Where, however, the second reaction is desired I have found that by increasing the NH₃ pressures sufficiently, I may obtain the second reaction directly without going through the intermediate or first NH₃ substitution reaction.

From the above description of the present invention and the specific embodiment described, it is believed apparent that the present invention may be widely applied in the synthesis of hydrogenatable organic compounds into amino compounds by the direct substitution of ammonia therein, and that depending upon the specific hydrogenating catalyst employed the synthesis reaction may be conducted at various temperatures and pressures to obtain a plurality of different products.

Whereas I have disclosed hereinabove the application of the present invention to the synthesis of but one hydrogenatable organic compound (oleic acid) into an amine, it is not to be construed that I am limited thereby as I have found that all hydrogenatable organic compounds may be similarly synthesized and converted into amines by the direct combination therewith of activated ammonia.

What I claim is:

1. The method of converting an amide of unsaturated fatty acid to an amino acid amide which comprises reacting the amide with anhydrous ammonia under pressure in the presence of a hydrogenating catalyst at the hydrogen activation temperature of said catalyst.

2. The method of claim 1, wherein an ammonia pressure not in excess of 150 pounds is employed.

3. The method of claim 1, wherein an ammonia pressure in excess of 150 pounds is employed.

4. The method of converting an unsaturated higher fatty acid into a high molecular weight amino acid amide which comprises the steps of converting the fatty acid to a fatty acid amide and reacting the fatty acid amide with anhydrous ammonia under pressure in the presence of a hydrogenating catalyst at the hydrogen activating temperature of the catalyst.

5. The method of converting oleic acid into a high molecular weight amino acid amide which comprises converting the oleic acid to oleic acid amide and reacting the oleic acid amide with anhydrous ammonia under pressure in the presence of a hydrogenating catalyst at the hydrogen activating temperature of the catalyst.

6. The method of converting oleic acid into a high molecular weight amino acid amide which comprises dissolving dehydrated oleic acid in benzine, reacting the dissolved oleic acid with anhydrous ammonia until the acid has been converted into oleic acid amide, and reacting the said amide with anhydrous ammonia under pressure less than 150 pounds in the presence of a hydrogenating catalyst, at the hydrogen activating temperature of the catalyst.

7. The method of converting oleic acid into a mixture of mono-nonylamine and omega octylamino acid amide which comprises dissolving dehydrated oleic acid in benzine, reacting the dissolved oleic acid with anhydrous ammonia to convert the said acid to oleic acid amide, and reacting the said amide in said solution with anhydrous ammonia under pressure in excess of 150 pounds in the presence of a hydrogenating catalyst at the hydrogen activating temperature of the said catalyst.

FREDERICK C. BERSWORTH.